US012566508B1

(12) United States Patent
Shutzberg

(10) Patent No.: US 12,566,508 B1
(45) Date of Patent: Mar. 3, 2026

(54) TECHNIQUES FOR TRIGGERING INPUT ACTIONS FROM DETECTED GESTURES

(71) Applicant: Apple Inc., Cupertino, CA (US)

(72) Inventor: Julian K. Shutzberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/679,954

(22) Filed: May 31, 2024

Related U.S. Application Data

(60) Provisional application No. 63/505,890, filed on Jun. 2, 2023.

(51) Int. Cl.
G06F 3/01 (2006.01)
(52) U.S. Cl.
CPC .............. G06F 3/017 (2013.01); G06F 3/013 (2013.01)
(58) Field of Classification Search
CPC .................................. G06F 3/017; G06F 3/013
See application file for complete search history.

(56) References Cited

U.S. PATENT DOCUMENTS

| | | | | |
|---|---|---|---|---|
| 9,875,399 | B2 * | 1/2018 | Hoy | G06V 20/52 |
| 2002/0118880 | A1 * | 8/2002 | Liu | G06F 3/017 |
| | | | | 382/199 |
| 2012/0200492 | A1 * | 8/2012 | Zhao | G06V 40/107 |
| | | | | 345/156 |
| 2012/0327009 | A1 * | 12/2012 | Fleizach | G06F 3/04883 |
| | | | | 345/173 |
| 2016/0291698 | A1 * | 10/2016 | Niinuma | G06F 3/017 |
| 2022/0021798 | A1 * | 1/2022 | Tsuru | G06F 3/0346 |

* cited by examiner

*Primary Examiner* — Rodney Amadiz
(74) *Attorney, Agent, or Firm* — Blank Rome LLP

(57) ABSTRACT

Processing gesture input includes detecting a first instance of a gesture based on hand tracking data, determining that the first instance of the gesture fails to satisfy an input action trigger based on a first set of heuristics for the gesture, and detecting a second instance of the gesture based on additional hand tracking data. In accordance with a determination that the second instance of the gesture is detected within a threshold time from the first instance of the gesture, a determination is made as to whether the second instance of the gesture satisfies the input action trigger based on a second set of heuristics for the gesture.

20 Claims, 9 Drawing Sheets

500

DETECT TOUCH BASED ON CONTACT DATA FROM HANDS
TRACKING
505

DETERMINE A STAGE OF THE TOUCH FROM THE HANDS TRACKING
DATA
510

ESTIMATE LOW LEVEL FEATURES ASSOCIATED WITH TOUCH
515

ESTIMATE HIGH-LEVEL, LOW-STATE FEATURES
520

COMBINE HIGH LEVEL FEATURES AND TOUCH STAGE TO CLASSIFY
INTENTIONALITY
525

TECHNIQUES FOR TRIGGERING INPUT ACTIONS FROM DETECTED GESTURES

BACKGROUND

Some devices can generate and present Extended Reality (XR) Environments. An XR environment may include a wholly or partially simulated environment that people sense and/or interact with via an electronic system. In XR, a subset of a person's physical motions, or representations thereof, are tracked, and in response, one or more characteristics of one or more virtual objects simulated in the XR environment are adjusted in a manner that comports with realistic properties. Some XR environments allow multiple users to interact with virtual objects or with each other within the XR environment. For example, users may use gestures to interact with components of the XR environment. However, what is needed is an improved technique to manage tracking of a hand performing the gesture.

DETAILED DESCRIPTION

Figure 1:
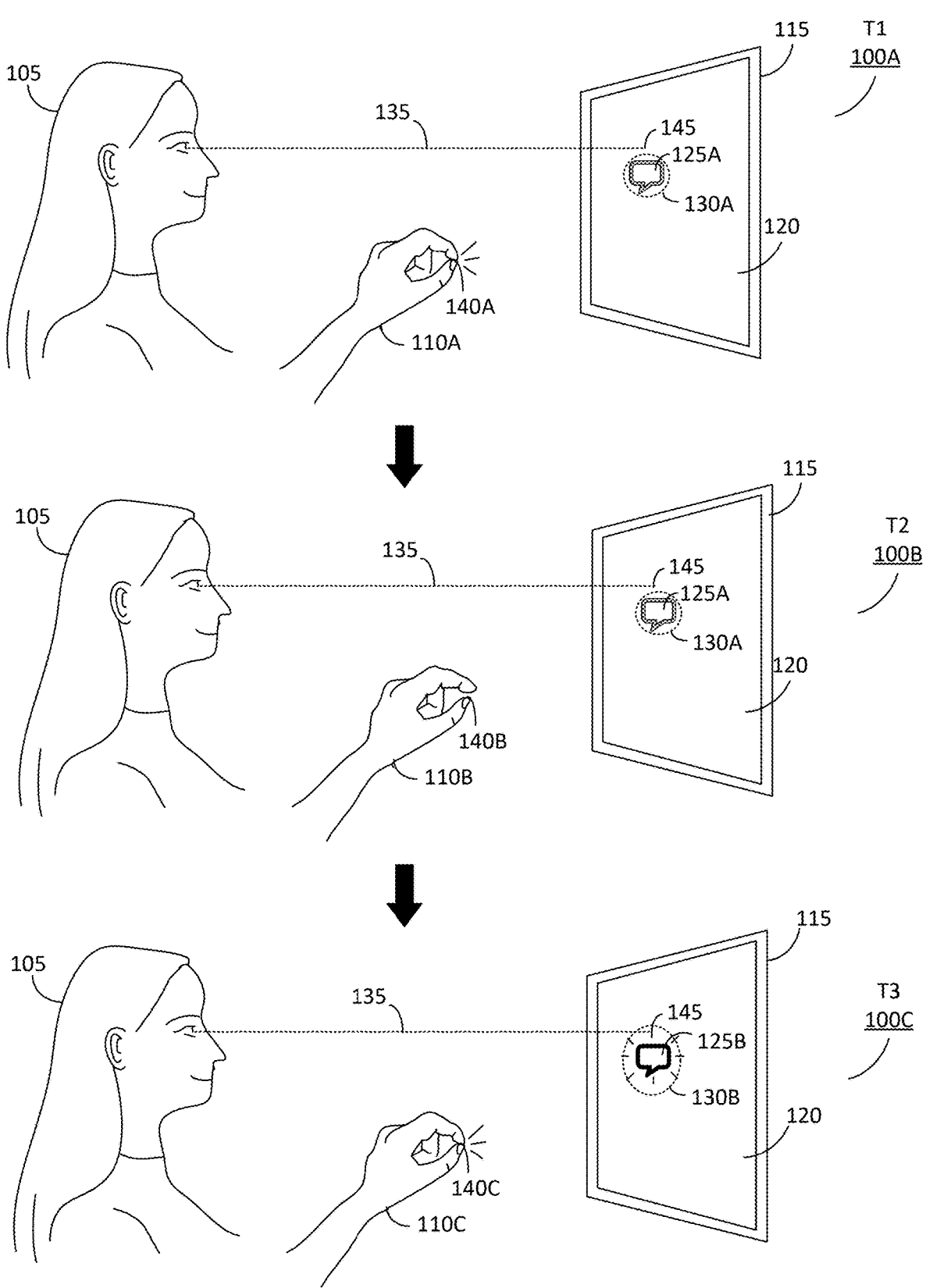
FIG. 1 shows an example diagram of determining an action for a repeated input gesture, in accordance with one or more embodiments.

This disclosure pertains to systems, methods, and computer readable media to enable gesture recognition and input. In particular, this disclosure relates to techniques for mitigating accidental rejection of repeated input actions.

In some extended reality contexts, image data and/or other sensor data can be used to detect gestures by tracking hand data. For some gestures, such as a gesture associated with a pinch, the hand pose information is obtained to determine whether a touch occurs between two fingers, or between two portions of a hand. A framework is applied to determine intentionality of the touch; intentionality may be determined based on hand tracking data. In some embodiments other considerations may be used, such as gaze information, other peripheral object information, user interface (UI) components, or other contextual information. The framework can then determine whether the input action should be enabled based on the intentionality of the gesture.

According to one or more embodiments, the various considerations that lead to the determination as to whether the input action should be enabled may sometimes lead to accidental rejection of user input gestures. This may occur, for example, with failed indirect selection attempts where a user input gesture is associated with selection of a user interface component. An indirect selection may include a gaze component and a hand component, where a location for the action associated with the hand gesture is based on a gaze direction. Thus, these failed indirect selections have several points of potential failure.

In some embodiments, when a user's selection attempt fails, the user may intuitively repeat the input gesture to perform a second selection attempt. Embodiments described herein are directed to a technique for modifying the gesture recognition and/or other determination for user input based on these gestures during a repeated attempt related to an interaction with a same interface element. In doing so, repeated accidental rejection of the attempted selection is mitigated. This may include, for example, increasing a target region around or more interface elements to cause a gaze component requirement to become more permissive such that a probability of a given gesture causing selection of the interface element increases. As another example, parameters associated with detecting valid input gestures may become more permissive on a subsequent attempt of a particular input gesture such that a given input gesture is more likely to be determined to be a valid input gesture.

In the following disclosure, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include Augmented Reality (AR) content, Mixed Reality (MR) content, Virtual Reality (VR) content, and/or the like. With an XR system, a subset of a person's physical motions, or representations are tracked, and in response, one or more characteristics of one or more virtual objects simulated in the XR environment, are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and adjust graphical content and an acoustic field presented to the person in a manner, similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include: head-mountable systems, projection-based systems, heads-up displays (HUD), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, or resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints) and that these goals may vary from one implementation to another. It will also be appreciated that such development efforts might be complex and time-consuming but would nevertheless, be a routine undertaking for those of ordinary skill in the design and implementation of graphics modeling systems having the benefit of this disclosure.

FIG. 1 shows a diagram of a technique for determining an action for a repeated input gesture, in accordance with one or more embodiments. In particular, FIG. 1 depicts three consecutive views of a user interacting with a user interface 120. In a first view, 100A, a user 105 is shown attempting a selection gesture. According to one or more embodiments, a selection gesture may be made up on multiple input components, such as a hand gesture component and a gaze component. A device may capture sensor data of the user's hand 110A, and gaze direction 135. In some embodiments, the device may use hand tracking or other vision-based tracking networks or procedures. That is, an electronic device may have one or more cameras or other sensors configured on or in the device in a manner such that images of the hand and/or eye tracking data is captured. The electronic device may be a mobile device such as a wearable device with cameras and/or other sensors facing toward the user's hands. As such, in some embodiments, the view depicted in 100A shows a user interface 120 on a display 115, which may be part of a head mounted device.

According to some embodiments, the device may use the sensor data to detect user input gestures and to process user input accordingly. In some embodiments, the device may determine an input action associated with a detected user input gesture based on a combination of eye tracking data and hand pose. For example, a user input action may be based on a gaze component and hand component of a gesture. In the first view at a first time T1 100A, the user 105 is attempting to perform a selection gesture to select a UI component 125A. As shown in this view, the user's gaze 135 is targeted at point 145 on the user interface 120. The user interface 120 may include a region on the display in which UI components are presented.

In some embodiments, a UI component 125A is associated with a target region 130A in which a user's gaze or attention is detected in order for the UI component 125A to be selected. For example, a user may gaze within the region, place a cursor within the region, or the like. Here, the gaze 135 is targeted at point 145 which is outside the target region 130A associated with UI component 125A. As such, when user 105 performs a selection gesture (here, in the form of a pinch 140A), the UI component will remain unselected. Notably, view 100A shows the hand 110A performing a recognized pinch 140A, which does not result in a selection of UI component 125A because the gaze location 145 falls outside a target region 130A for the UI Component 125A.

Turning to T2 100B, the user 105 has moved the hand to a new position 110B. Here, the pinch gesture has ended, as shown by the lack of touch at 140B. Similarly to the above at T1 100A, the gaze 135 is targeted at point 145 which is outside the target region 130A associated with UI component 125A.

At T3 100C, the user 105 moves the hand 110C to repeat the pinch gesture 140C as a repeated instance of the pinch gesture. As shown, the pinch gesture 140C is recognized as a valid pinch. In this view, because the gesture is a repeated gesture, then the target region 130B has increased. According to some embodiments, by increasing the target region results in an increased chance that the gesture will be detected as a selection gesture because the gaze does not have to be as closely targeted to the input component to be detected. As such, in the view at T3 100C, the gaze 135 is still targeted at point 145, which is now within the target region 130B for the UI component 125B, because the target region 130B is larger than the original target region 130A. Because the pinch gesture 140C is determined to be a valid pinch gesture, and the gaze target 145 is within a target region 130B for the UI component 125B, UI component 125B is selected, as shown by the modified presentation of UI component 125B from UI component 125A.

Figure 2:
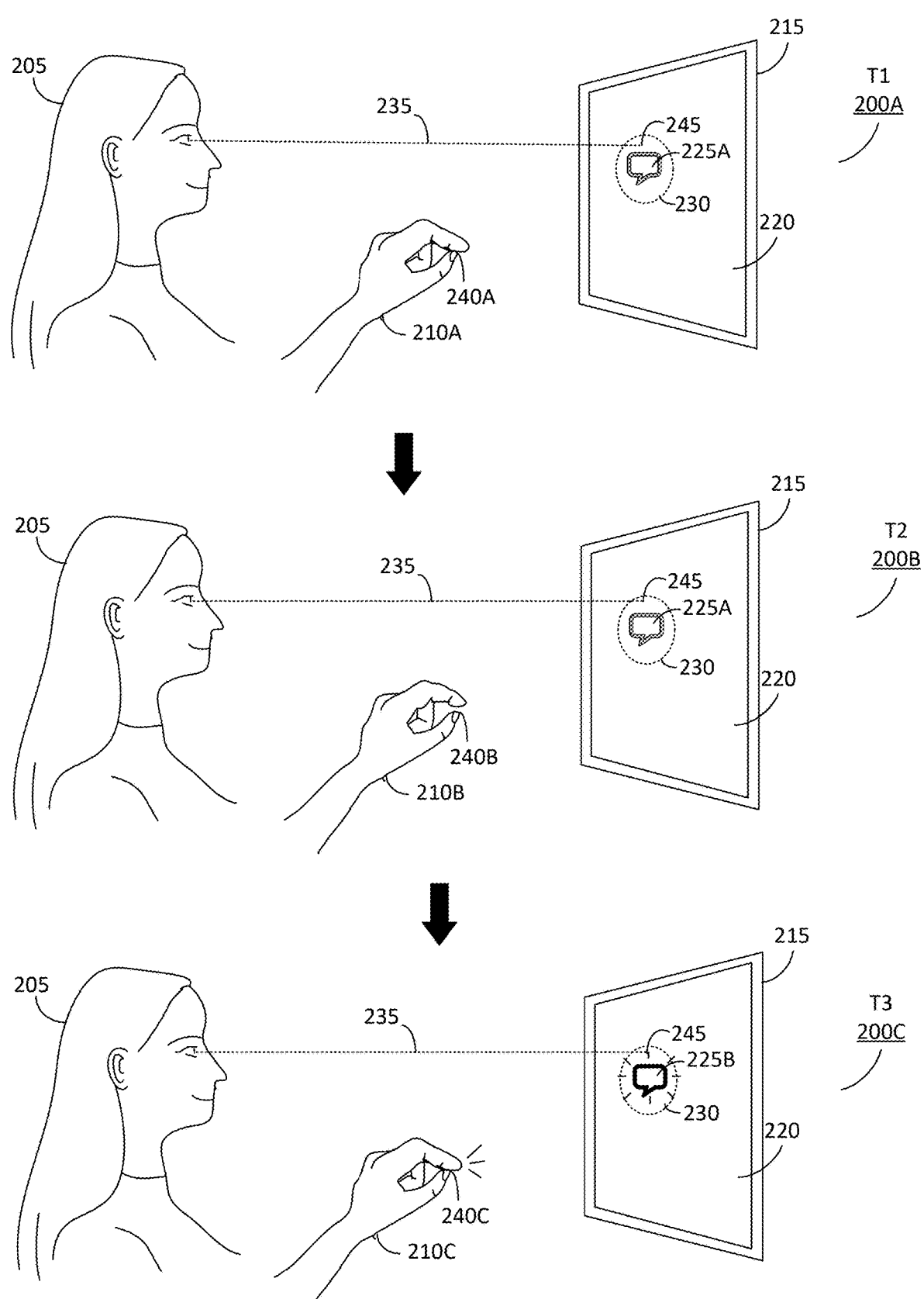
FIG. 2 shows an example diagram of detecting a repeated gesture, in accordance with one or more embodiments.

FIG. 2 shows an alternate diagram of a technique for determining an action for a repeated input gesture, in accordance with one or more embodiments. In particular, FIG. 2 depicts three consecutive views of a user interacting with a user interface 220. In a first view, at T1 200A, a user 205 is shown attempting a selection gesture. A device may capture sensor data of the user's hand 210A, and gaze direction 235. In some embodiments, the device may be the device may use hand tracking or other vision-based tracking networks or procedures. That is, an electronic device may have one or more cameras or other sensors configured on or in the device and in a manner such that images of the hand and/or eye tracking data is captured. The electronic device may be a mobile device such as a wearable device with cameras and/or other sensors facing toward the user's hands. As such, in some embodiments, the view depicted in 200A shows a user interface 220 on a display 215 which may be part of a head mounted device.

According to some embodiments, the device may use the sensor data to detect user input gestures, and to process user input accordingly. In some embodiments, the device may determine an input action associated with a detected user input gesture based on a combination of eye tracking data and hand pose. For example, a user input action may be based on a gaze component and hand component of a gesture. In the first view at a first time T1 200A, the user 205 is attempting to perform a selection gesture to select a UI component 225A. As shown in this view, the user's gaze 235 is targeted at gaze target 245 on the user interface 220. The user interface 220 may include a region on the display in which UI components are presented.

In some embodiments, a UI component 225A is associated with a target region 230 in which a user's gaze or attention is detected in order for the UI component 225A to be selected. For example, a user may gaze within the region, place a cursor within the region, or the like. Here, the gaze 235 is targeted at point 245, which is within the target region 230 associated with UI component 225A. However, in this example, the gesture is not a well-formed pinch, as shown by the thumb not making contact with a tip of the index finger at 240A. As will be described in greater detail below, in order to determine an intentional pinch (or other touch-based gesture), hand tracking data may be analyzed and unintentional pinches may be disregarded. As such, when user 205 performs a selection gesture (here, in the form of the attempted pinch 240A), the UI component 225A will remain unselected. Said another way, user 205 performs a failed selection due to the ill-formed pinch.

Turning to T2 200B, the user 205 has moved the hand to a new position 210B. Here, the attempted pinch gesture has ended, as shown by the lack of touch at 240B. Similarly to the above at T1 200A, the gaze 235 is targeted at point 245 which remains within the target region 230 associated with UI component 225A.

At T3 200C, the user 205 moves the hand 210C to repeat the pinch gesture 240C. As shown, the pinch gesture 240C is now recognized as a valid pinch. In this view, because the gesture is a repeated gesture (a second attempted pinch), the parameters by which the gesture is determined to be an intentional gesture are adjusted to be more permissive, such that a given gesture is more likely to lead to a valid input. In the current example, although the touch occurs away from the tip of the finger, the gesture can now be identified as an intentional pinch gesture. Said another way, even though the pose of hand 210C is similar to pose 210A, the pose 210C is identified as a valid pinch gesture, whereas the pose 210A was not. Because the pinch gesture 240C is determined to be a valid pinch gesture, and the gaze target 245 is within a target region 230 for the UI component 225B, UI component 225B is selected, as shown by the modified presentation of UI component 225B from UI component 225A.

Figure 3:
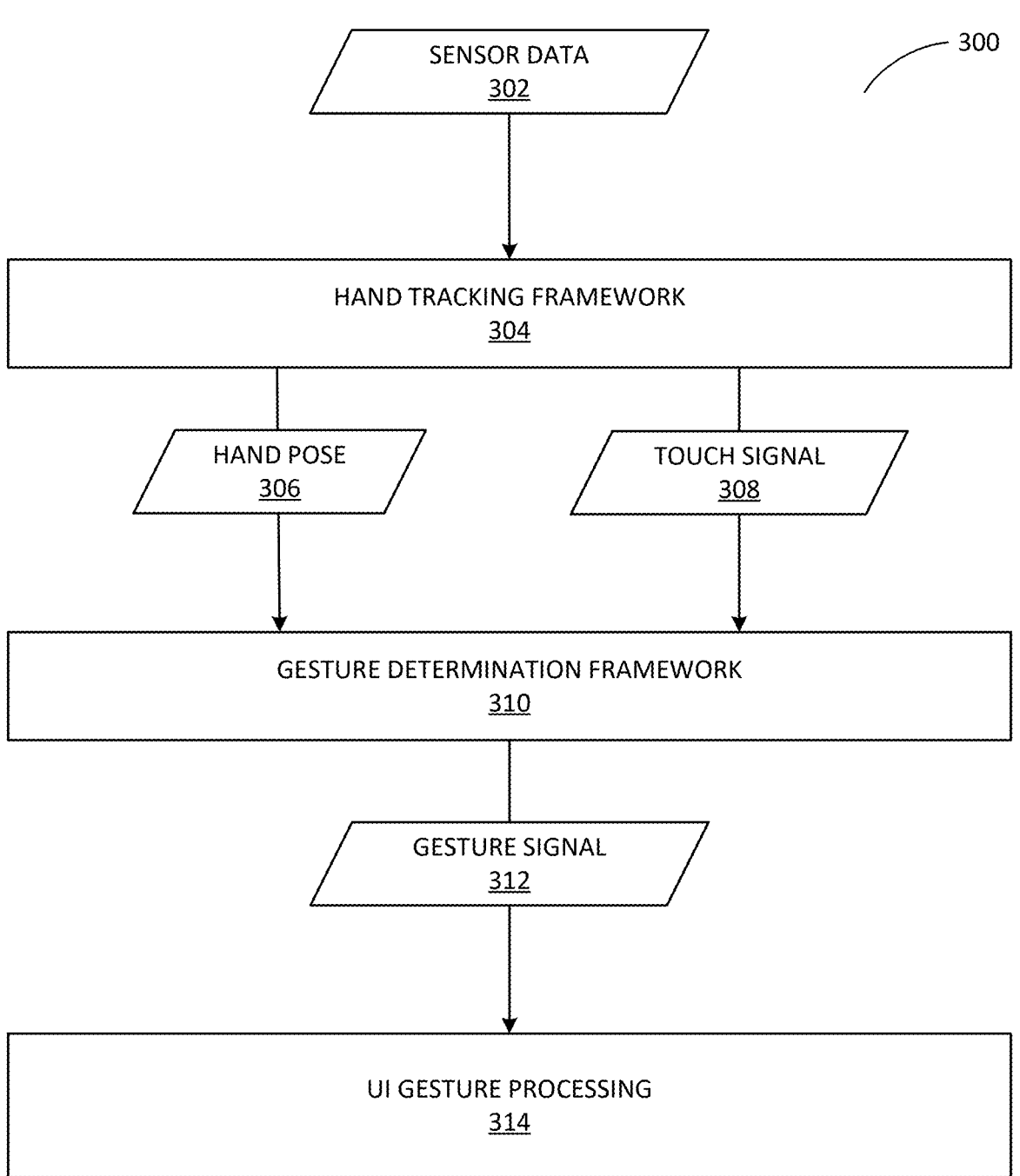
FIG. 3 shows a flow diagram of a technique for detecting input gestures, in accordance with some embodiments.

As described above, confirming an intended gesture may be based on various parameters. FIG. 3 shows a flow diagram of a technique for detecting input gestures, in accordance with some embodiments. In particular, FIG. 3 shows a flow diagram 300 of a gesture estimation pipeline in which a user input gesture is recognized and processed. Although the flow diagram shows various components which are described as performing particular processes, it should be understood that the flow of the diagram may be different in accordance with some embodiments, and the functionality of the components may be different in accordance with some embodiments.

The flow diagram 300 begins with sensor data 302. In some embodiments, the sensor data 302 may include image data and/or depth data captured of a user's hand or hands. In some embodiments, the sensor data 302 may be captured from sensors on an electronic device, such as outward facing cameras on a head mounted device, or cameras otherwise configured in an electronic device to capture sensor data including a user's hands. According to one or more embodiments, the sensor data 302 may be captured by one or more cameras, which may include one or more sets of stereoscopic cameras. In some embodiments, the sensor data 302 may include additional data collected by an electronic device and related to the user. For example, the sensor data 302 may provide location data for the electronic device, such as position and orientation of the device.

In some embodiments, the sensor data 302 may be applied to a hand tracking framework 304. The hand tracking framework 304 may be or include a network trained to estimate a physical state of a user's hand or hands. In some embodiments, the hand tracking framework 304 predicts a hand pose 306. The hand pose may be a classified pose of a hand based on the estimated physical state, or may provide some other form of data indicative of a pose of a hand. For example, in some embodiments, the hand pose data 306 may include an estimation of joint location for a hand. Further, in some embodiments, the hand tracking framework 304 may be trained to provide an estimation of a device location, such as a headset, and/or simulation world space.

In some embodiments, the hand tracking framework 304 may further be configured to provide touch data. The touch data may include a prediction as to whether, for a given frame or frames, a touch is occurring between two regions on the hand. This determination may be provided in the form of a touch signal 308. For example, a machine learning model may be trained to predict whether two portions of a hand are in contact. In some embodiments, the hand tracking network may additionally determine the locations on the hand making contact during the touch. As will be described in greater detail below, in some embodiments, the hand tracking framework 304 may predict whether a touch occurs based on the sensor data 302 and/or hand pose data 306.

According to one or more embodiments, the hand pose data 306 and/or touch signal 308 may be determined based on a set of heuristics, as will be described in greater detail below. These heuristics may be used to determine whether a hand pose 306 is associated with a user input gesture. The heuristics used to make the determinations may be predefined, and/or may be variable based on system and user conditions. For example, in some embodiments, when a repeated action is detected after a failed attempt for the action, then the heuristics may be modified such that the process for detecting the particular hand pose 306 and/or touch signal 308 may differ between attempts. That is, on a repeated attempt of a user input gesture, the heuristics used to detect whether that gesture should be associated with an input action may be more permissive such that the repeated gesture is more likely to be determined to cause user input than the initial user input gesture. The less-strict heuristics may be predefined, for example, as a second set of heuristics associated with a particular input gesture or hand pose data 306 or may be dynamically modified for the repeated attempt.

In some embodiments, the heuristics used to determine a hand pose data 306 or touch signal 308 may be modified dynamically for a repeated action based on a reason why a recent attempt failed. For example, if the recent attempt failed because the touch signal 308 indicated no touch was detected, but the hand pose data 306 was close enough to a particular gesture as to identify a particular gesture attempt, then heuristics surrounding a detected touch may be modified. As another example, the heuristics used to determine an attempted gesture from a particular pose may be modified such that the gesture is more likely to be detected in a repeated attempt. Thus, the various input components may be differently prioritized.

According to one or more embodiments, gesture determination framework 310 provides a determination as to whether a particular pose presented in the sensor data 302 is intentional. That is, a determination is made as to whether a classified pose of the hand (for example, based on or provided by the hand pose data 306) is intentional. When the determined hand pose includes a touch, such as a pinch, then the gesture determination framework 310, may use the touch signal 308 provided by the hand tracking framework 304 in determining whether an intentional gesture is performed.

In some embodiments, the gesture determination framework 310 may utilize additional data not explicitly depicted in FIG. 3. For example, the gesture determination framework 310 may receive signals such as user interface (UI) geometry, gaze estimation, events generated by connected peripherals, user interaction with objects, and the like. As will be described in FIG. 5., the gesture determination framework 310 may consider the various features from the inputs to make a determination for a particular input gesture, whether the gesture is considered to be intentional, such as whether a set of heuristics are determined to indicate an intentionality of the gesture. This determination may be transmitted in the form of a gesture signal 312 to a UI gesture processing module 314. The gesture signal 312 may indicate whether or not an intentional input gesture has occurred. In some embodiments, the gesture signal 312 may also be used to indicate whether a previous gesture signal should be cancelled. This may occur, for example, if a user shifts their position, sets their hands down, or the like.

In some embodiments, the additional information may be used to determine whether to modify heuristics for a repeated action. For example, the intentionality determination may be more permissive on a repeated attempt. That is, the heuristics which lead to a gesture to be classified as intentional may be modified for a repeated gesture such that the repeated gesture is more likely to be classified as intentional than the original gesture. As another example, a target region for a UI component may be increased if a gaze component of a gesture is determined to cause an input action to fail. In some embodiments, if a gaze component of a selection gesture causes the selection to fail, then the target region for one or more UI components may increase. In some embodiments, a target region for one or more closest UI components to the gaze target may increase.

The UI gesture processing module 314 may be configured to enable a user input action based on the gesture signal 312. A particular gesture, such as a pinch, may be associated with a selection action of a UI component or the like. In some embodiments, if a cancellation signal is received corresponding to a gesture signal 312, which has already been initiated, the system can process that gesture differently than if it were not cancelled. For example, a UI component can be shown as selected but not activated, etc. As another example, a previously initiated stroke drawn by the user can be truncated or undone.

Figure 4:
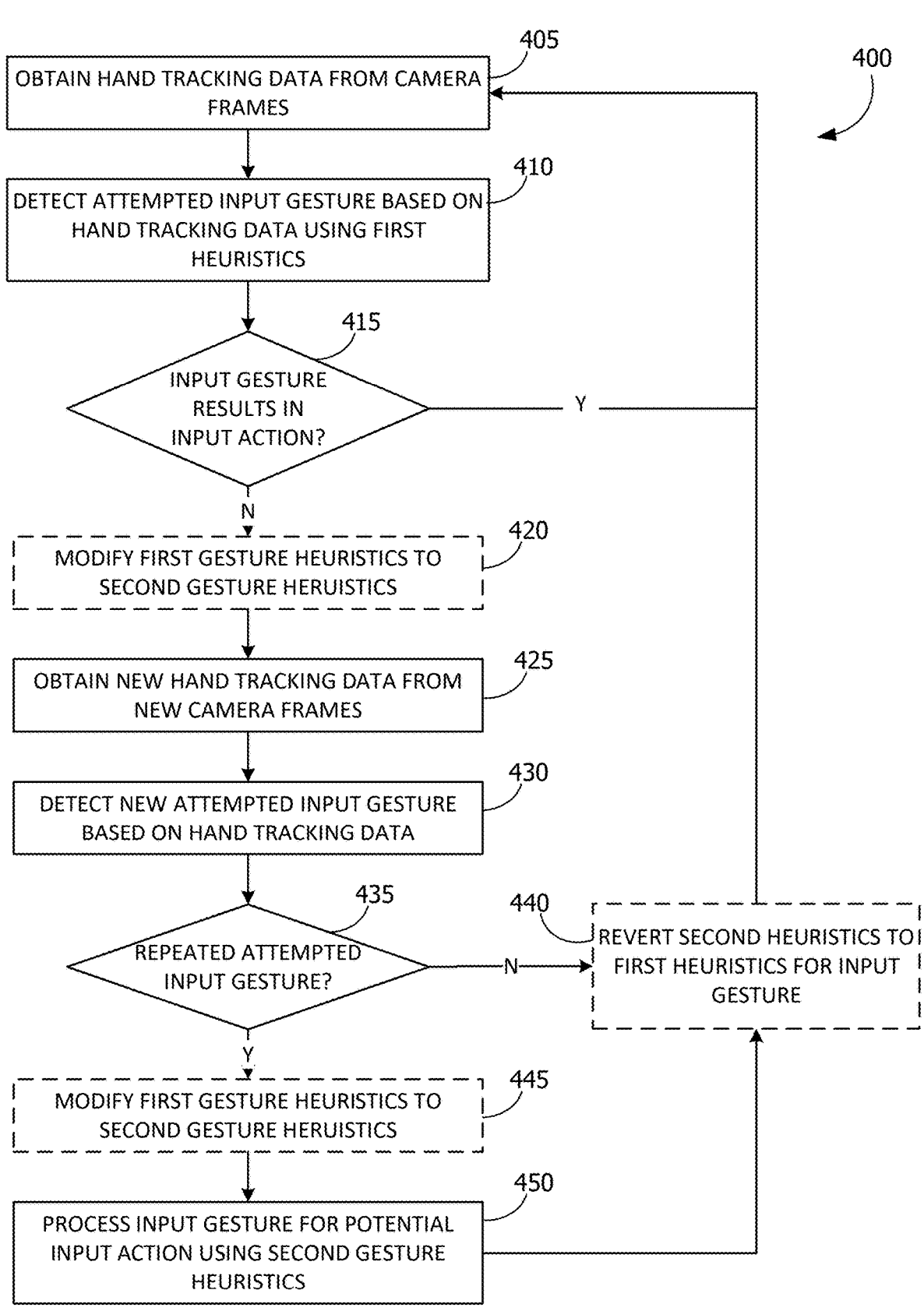
FIG. 4 shows a flowchart of a technique for processing gesture input, in accordance with some embodiments.

FIG. 4 depicts a flowchart of a technique for processing gesture input, in accordance with some embodiments. For purposes of explanation, the following steps will be described as being performed by particular components, as described in FIG. 3. However, it should be understood that the various actions may be performed by alternate components. The various actions may be performed in a different order. Further, some actions may be performed simultaneously, some may not be required, or others may be added.

The flowchart 400 begins at block 405, where hand tracking data is obtained from camera frames. According to one or more embodiments, the hand tracking data may include image data and/or depth data. The hand tracking data may be obtained from one or more cameras, including stereoscopic cameras or the like. In some embodiments, the hand tracking data may include sensor data 302 captured by outward-facing cameras of a head mounted device. The hand tracking data may be obtained from hand tracking framework 304, or another source which generates hand pose data 306 and a touch signal 308 from camera or other sensor data 302.

The flowchart 400 continues at block 410, where an attempted input gesture is detected based on hand tracking data and using a first set of heuristics. Initially, a hand pose may be determined based on the hand tracking data. As described above, the device may consider gaze information, UI geometry, contextual information, or the like. The hand pose data may include joint locations and/or orientations, skeletal features, and the like. In some embodiments, other data can be provided by the hand pose network which is derived from the determination of the hand pose. For example, a relative location of a device to the hand may be determined based on the hand pose data 306. In doing so, the hand tracking network 304 may provide an estimated location for a device. The gesture is detected based on the hand pose. In some embodiments, the device may select a gesture from among a set of predefined gesture classifications based on the pose. In some embodiments, the gesture may be based on hand pose in a single frame (or, in some embodiments, stereoscopic frame pair), over a series of frames, or the like. The gesture may be determined, for example, by a gesture determination framework 310, as described above. The hand tracking module 304 may determine the hand pose, and/or the gesture determination framework 310 may detect a gesture based on a first set of heuristics. The heuristics may indicate a confidence level at which a particular hand pose is determined to be performing an input gesture, or bounds by which a particular input gesture is determined to be performed.

At block 415, a determination is made as to whether the input gesture results in an input action. This may occur, for example, when the input gesture detected at block 410 is determined to be an intentional input gesture, and not discarded as accidental. Thus, the particular gesture may be identified, but may fall short of being sufficient to result in an input action. The process for determining intentionality of an input gesture will be discussed in greater detail below with respect to FIG. 5. In addition, in some embodiments, in order for the input gesture to result in an input action, additional contextual features may need to be present. As an example, if the gesture is a selection gesture based on gaze data, a user's gaze may need to align with a target region for a UI element, as shown above in the example of FIG. 1. If a determination is made that the input gesture results in an input action, then the flowchart 400 returns to block 405 and hand tracking data continues to be obtained and processed.

Returning to block 415, if a determination is made that the attempted input gesture does not result in an input action, then the flowchart proceeds to optional block 420. At block 420, the first gesture heuristics are modified to second gesture heuristics. The gesture heuristics may be particular, modifiable heuristics, which are used to detect input gestures, and/or determine an intentionality of the input gesture or whether the input gesture should cause a selection of a component. Modifying the heuristics includes causing the first set of heuristics to be more forgiving, such that it becomes easier for an attempted input gesture to result in an input action. According to some embodiments, the heuristics may be modified dynamically upon a detected failed attempt or in response to a detected repeated attempt. The heuristics may be modified in a predefined manner, or based on characteristics of the failed attempt, such as a parameter of the attempted gesture which cause the attempt to fail. In some embodiments, a gesture may be associated with multiple sets of predefined heuristics, and modifying the first gesture heuristics to second gesture heuristics may involve selecting a second set of predefined heuristics for the gesture, where the second set of predefined heuristics may be more likely to detect a valid input gesture than the first set of heuristics.

The flowchart 400 continues to block 425, where new hand tracking data is obtained from new camera frames. In some embodiments, the hand tracking data may be continuously obtained from the one or more cameras, including stereoscopic cameras or the like. In some embodiments, the hand tracking data may include sensor data 302 captured by outward facing cameras of a head mounted device. The hand tracking data may be obtained from hand tracking network 304, or another source which generates hand tracking data from camera or other sensor data 302.

At block 430, a new attempted input gesture is detected based on the hand tracking data. An attempted input gesture may be determined, for example, when a hand pose over a set of frames matches a predefined input gesture with some level of confidence. For purposes of this flowchart, an attempted input gesture occurs when a gesture determination framework 310 determines that a hand pose is potentially associated with a particular input gesture. In some embodiments, the attempted input gesture may fail, for example, when the particular pose is insufficient to trigger an input action, or when it is determined that the gesture was performed unintentionally. Thus, an attempted input gesture may include actual input gestures, and hand poses that are sufficiently close to input gestures based on a given set of heuristics.

The flowchart continues to block 435 where a determination is made as to whether the new attempted input gesture is a repeated attempted input gesture. An input gesture is a repeated input gesture if the new attempted input gesture is associated with the same input gesture as a prior attempted input gesture. In some embodiments, other considerations are used to determine whether an attempted input gesture is a repeated input gesture. For example, the new attempted input gesture may have to occur within a predetermined time from the prior attempted input gesture. As another example, the new attempted input gesture being associated with the same input gesture as the immediately preceding attempted input gesture may cause the new attempted input gesture to be a repeated input gesture. That is, no other input gestures may be recognized between the two input gesture attempts of the same type of input gesture and, if applicable, a gaze location associated with the two input gestures is within a threshold distance.

In some embodiments, determining whether the new attempted gesture is a repeated input gesture may include determining whether the detected gesture is a predefined accidental behavior, in which case the repeated gesture is not determined to be a repeated attempted input gesture. For example, some predefined repetitive behaviors may include user motion that may be similar to an input gesture. As an example, a user scratching their arm may appear as a repeated pinch. These predefined accidental behaviors may be detected based on additional sensor or contextual data. For example, if a pinch is detected near an arm, it may be determined to be a self-interaction and not an input gesture. If the new attempted input gesture is not determined to be a repeated attempted input gesture, then the flowchart 400 proceeds to optional block 440, and the heuristics used for the particular input gesture are reverted from the second set of heuristics to the first set of heuristics. In some embodiments, if block 420 is not performed, then block 440 may be disregarded because the heuristics do not need to be reverted. The flowchart 400 then returns to block 405, and the system continues to process hand tracking data.

Returning to block 435, if a determination is made that the new attempted input gesture is a repeated input gesture, then the flowchart 400 proceeds to block 445, where, as an optional step, the first gesture heuristics are modified to second gesture heuristics. This may occur, for example, if block 420 was not performed. The gesture heuristics may be particular, modifiable heuristics, which are used to detect input gestures, and/or determine an intentionality of the input gesture or whether the input gesture should cause a selection of a component. The flowchart 400 then proceeds to block 450, where the system processes the input gesture for potential input actions using the second gesture heuristics. That is, the more relaxed heuristics are used to process the attempted input gesture to be more forgiving in determining whether the input gesture should trigger a user input action. Thus, the input action may not be triggered on a repeated attempt, but the input action may be more likely to be triggered on a repeated attempt due to the relaxed second set of heuristics. The flowchart 400 then returns to block 440, where the heuristics used for the particular input gesture are reverted from the second set of heuristics to the first set of heuristics. The flowchart 400 then returns to block 405, and the system continues to process hand tracking data.

Figure 5:
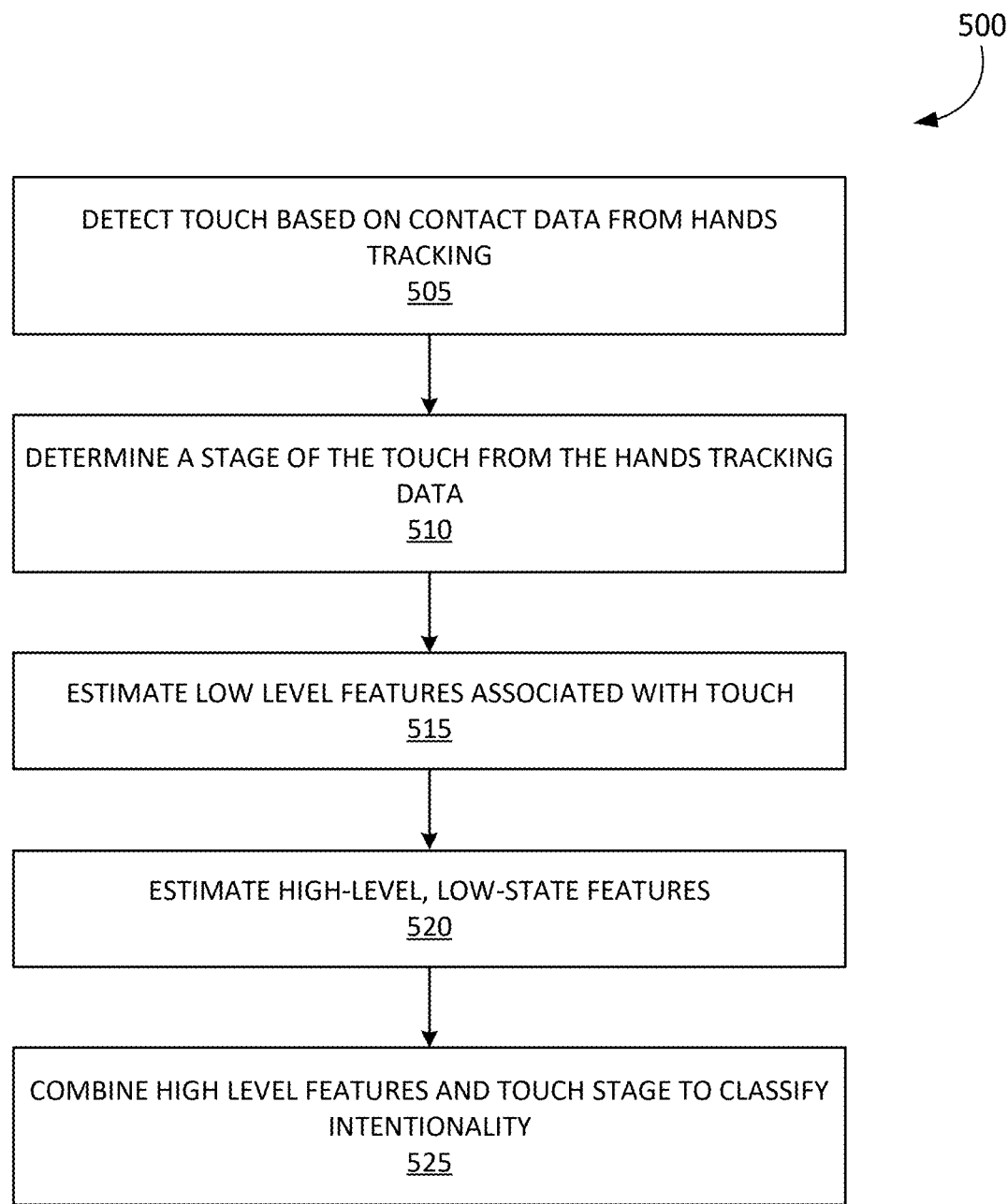
FIG. 5 shows a flowchart of a technique for classifying intentionality of a gesture, in accordance with some embodiments.

As described above, the gesture determination framework may be configured to generate a classification of intentionality for a gesture. The gesture determination framework 310 may be configured to estimate a pose or gesture of a hand and determine whether the gesture was intended to be used for triggering a user input action. FIG. 5 shows a flowchart of a technique for classifying intentionality of a gesture, in accordance with some embodiments. For purposes of explanation, the following steps will be described as being performed by particular components of FIG. 3. However, it should be understood that the various actions may be performed by alternate components. The various actions may be performed in a different order. Further, some actions may be performed simultaneously, some may not be required, or others may be added.

The flowchart 500 begins at block 505, where a touch is detected based on context data from the hand tracking network. The touch may be detected, for example, based on a touch signal 308 received from the hand tracking framework 304. According to some embodiments, some gestures may require touch, such as a pinch or the like. Further, multiple types of pinches may be recognized with different kinds of touch. According to some embodiments, not every gesture may require a touch. As such, the touch may not be detected, or the touch signal 308 may not indicate that the touch occurs. In some embodiments, the touch signal 308 may not be received, or may otherwise be ignored and a gesture may still be recognized.

The flowchart 500 continues to block 510, where a touch stage is determined from hand tracking data. The touch stage may indicate, for a given frame, what phase of the touch action the fingers are currently in. According to some embodiments, the features of interest in determining intentionality may vary depending upon a current state of a gesture. For gestures that include a pinch or other touch action, the stage in which the gesture is currently in may affect the ability to enable, cancel, or reject an associated input action. Some examples of touch stages include an idle state, which is an entry state in which a touch event is beginning, such as a pinch down phase. Another examples are a hold state, where a pinch is currently occurring, and an exit state, for example when a pinch up occurs for the pinch is ending. The various touch stages will be described in greater detail below with respect to FIG. 6.

Following block 510 at block 515, low-level features are estimated in association with the touch. The low-level features may be determined from the hand tracking data and/or additional data may include estimations of what a hand is doing during the frame. For example, other sources of data include pose information for a device capturing the hand tracking data, hand pose, UI geometry, etc. In some embodiments, the low-level features are determined without regard for intent. Examples of low-level features include, for example, a pinch speed on pinch down, a measure of wrist flex, finger curl, proximity of hand to head, velocity of hand, and the like.

The flowchart 500 continues to block 520, where high-level, low-state features are estimated. The high-level, low-state features may include modal features, which estimate what a user is doing during the touch in order to determine intentionality. In some embodiments, the high-level features may be features which are interoperable, and which can be individually validated. Examples include estimates as to whether hands are using one or more peripheral devices, a frequency of a repetition of a gesture (for example, if a user is pinching quickly), if hand is holding an object, if a hand is in a resting position, and a particular pinch or gesture style (i.e., a pinch using pads of two fingers, or using the side of a finger). In some embodiments, the high-level features may be based on user activity, such as a user fidgeting, talking, or reading. According to one or more embodiments, the high-level features may be determined based on the hand tracking data, the determined touch stage, and/or the estimated basic features. In some embodiments, the high-level features may directly determine intentionality of an action. As an example, if a user is using a peripheral device such as a keyboard, a pinch may be rejected, or the gesture may be determined to be unintentional.

The flowchart concludes at block 525, where the gesture determination framework 310 combines high-level features and the touch stage to classify intentionality. In some embodiments, the gesture determination framework 310, uses a conditional combination of high-level features and touch stage to classify intentionality. The classification can then be used to signal the gesture to be processed as an input gesture (thereby activating an associated UI input action), cancel the associated action if the gesture is determined to be unintentional (for example, if a UI action associated with the gesture has already been initiated), or disregard the gesture.

According to some embodiments, the gesture determination framework 310 can use multiple sets of parameters to determine intentionality in different ways. For example, a particular gesture may be analyzed for intentionality by comparing or otherwise using the low-level and/or high-level features against a first set of heuristics to determine intentionality. When a gesture is determined to be a repeated attempted gesture, the low-level and/or high-level features may be compared or otherwise used with the second set of heuristics to determine intentionality.

In some embodiments, the heuristics may be applied in different ways. For example, the mitigation of repeated actions may be useful for avoiding accidental rejection of selection actions. These actions may include a pinch or other gesture that includes a touch. A touch signal can be provided by a hand tracking module and can indicate if a touch event is occurring for a frame, can be determined in a number of ways. For example, in some embodiments, heuristics can be used based on the hand tracking data to determine whether a touch has occurred, and/or a current touch stage.

Figure 6:
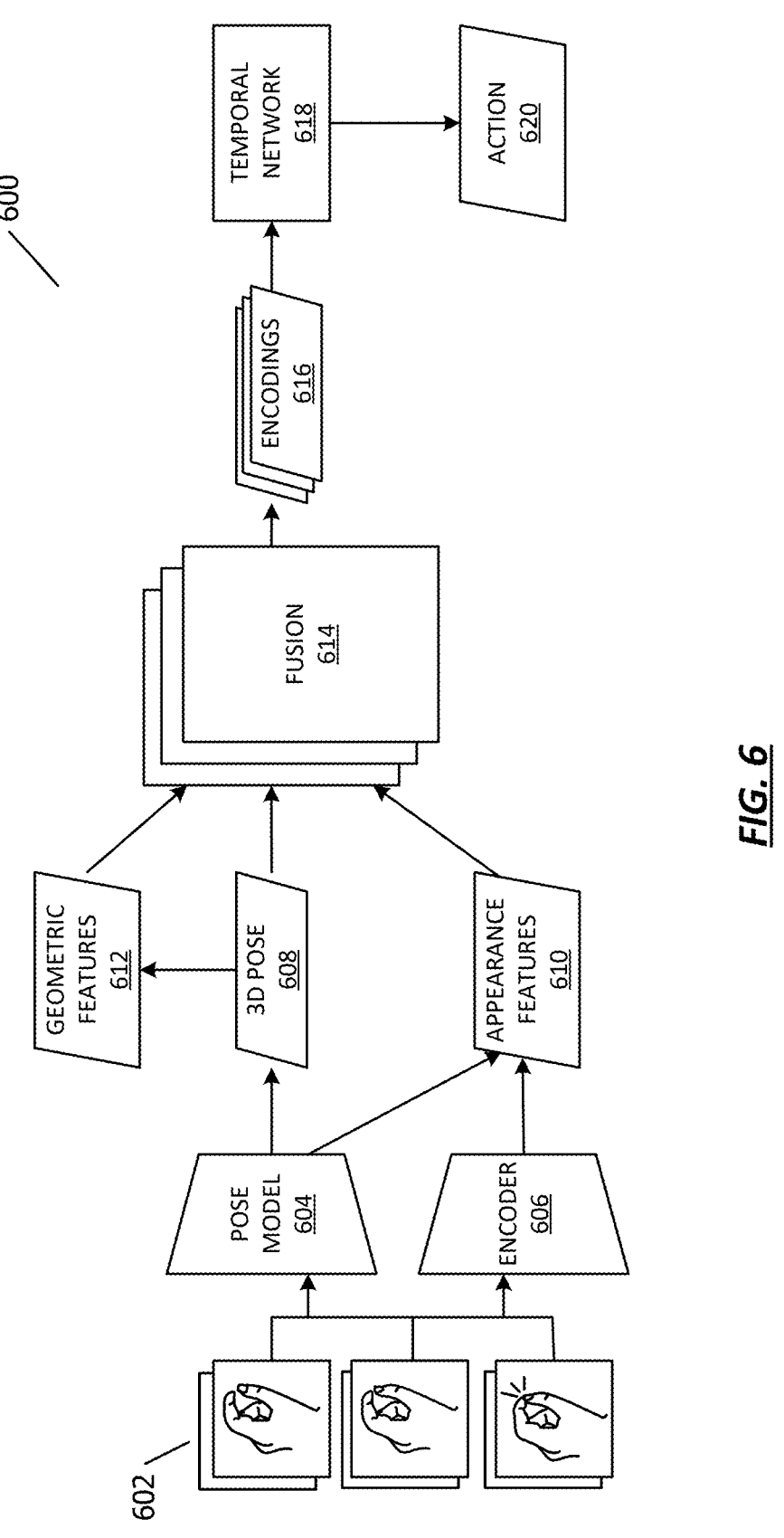
FIG. 6 shows a flow diagram of an action network, in accordance with some embodiments.

FIG. 6 shows a flow diagram of an action network, in accordance with some embodiments, which provide an example machine learning process for determining whether a touch has occurred. The pipeline 600 begins with a set of frames 602 as input. The frames 602 may be a temporal series of image frames of a hand captured by one or more cameras. The cameras may be individual cameras, stereo cameras, cameras for which the camera exposures have been synchronized, or a combination thereof. The cameras may be situated on a user's electronic device, such as a mobile device or a head mounted device. The frames may include a series of one or more frames associated with a predetermined time. For example, the frames 602 may include a series of individual frames captured at consecutive times, or can include multiple frames captured at each of the consecutive times. The entirety of the frames may represent a motion sequence of a hand from which a touch may be detected or not for any particular time, The frames 602 may be applied to a pose model 604. The pose model 604 may be a trained neural network configured to predict a 3D pose 608 of a hand based on a given frame (or set of frames, for example in the case of a stereoscopic camera) for a given time. That is, each frame of frame set 602 may be applied to pose model 604 to generate a 3D pose 608. As such, the pose model 604 can predict the pose of a hand at a particular point in time. In some embodiments, geometric features 612 may be derived from the 3D pose 608. The geometric features may indicate relational features among the joints of the hand, which may be identified by the 3D pose 608. That is, in some embodiments, the 3D pose 608 may indicate a position and location of joints in the hand, whereas the geometric features 612 may indicate the spatial relationship between the joints. As an example, the geometric features 612 may indicate a distance between two joints, etc.

In some embodiments, the frames 602 may additionally be applied to an encoder 606, which is trained to generate latent values for a given input frame (or frames) from a particular time indicative of an appearance of the hand. The appearance features 610 may be features which can be identifiable from the frames 602, but not particularly useful for pose. As such, these appearance features may be overlooked by the pose model 604, but may be useful within the pipeline 600 to determine whether a touch occurs. For example, the appearance features 610 may be complementary features to the geometric features 612 or 3D pose 608 to further the goal of determining a particular action 620, such as whether a touch has occurred. According to some embodiments, the encoder 606 may be part of a network that is related to the pose model 604, such that the encoder may use some of the pose data for predicting appearance features. Further, in some embodiments, the 3D pose 608 and the appearance features 610 may be predicted by a single model, or two separate, unrelated models. The result of the encoder 606 may be a set of appearance features 610, for example, in the form of a set of latents.

A fusion network 614 is configured to receive, as input, the geometric features 612, 3D pose 608, and appearance features 610, and generate, per time, a set of encodings 616. The fusion network 614 may combine the geometric features 612, 3D pose 608, and appearance features 610 in any number of ways. For example, the various features can be weighted in the combination in different ways or otherwise combined in different ways to obtain a set of encodings 616 per time.

The encodings are then run through a temporal network 618, to determine an action 620 per time. The action 620 may indicate, for example, whether a touch, or change in touch stage has occurred or not. The temporal network 618 may consider both a frame (or set of frames) 602 for a particular time for which the action 620 is determined, as well as other frames in the frame set 602.

According to some embodiments, a particular gesture may have different components which are used to determine whether a gesture triggers a user input action. For example, an indirect selection may include a gaze component and a hand component, where a location for the action associated with the hand gesture is based on a gaze direction. Thus, the associated input action is reliant upon a hand component and a gaze component.

Figure 7:
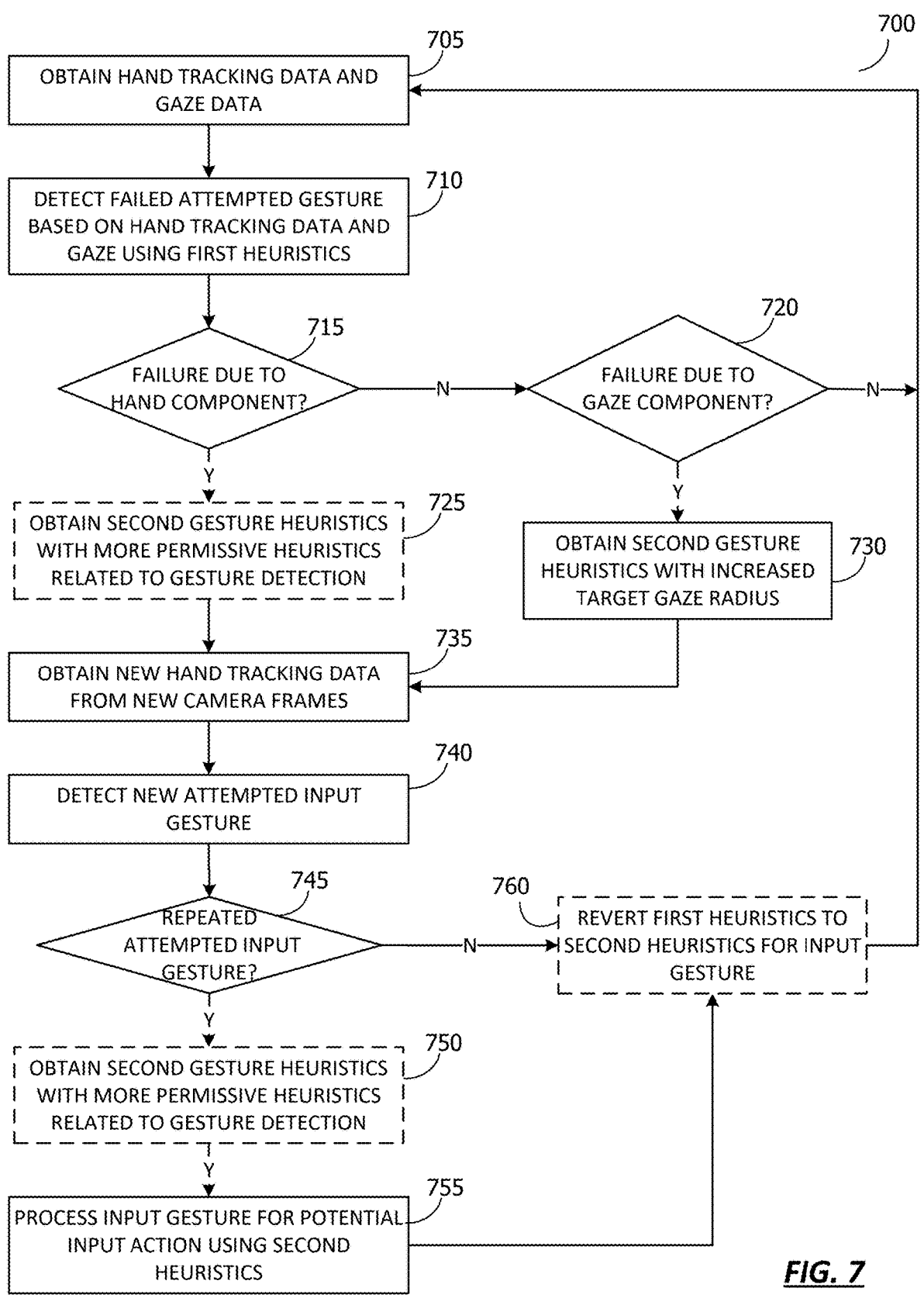
FIG. 7 shows a flowchart of a technique for modifying heuristics for detecting input gestures, according to some embodiments.

FIG. 7 shows a flowchart of a technique for modifying heuristics for detecting input gestures, according to some embodiments. Some input actions rely on multiple components of user behavior. As an example, selection actions may be triggered based on a pinch and a targeted gaze. In these cases, heuristics for one or more of the components of the gesture may be modified. For purposes of explanation, the following steps will be described as being performed by particular components as described in FIG. 3. However, it should be understood that the various actions may be performed by alternate components. The various actions may be performed in a different order. Further, some actions may be performed simultaneously, some may not be required, or others may be added.

The flowchart 700 begins at block 705, where hand tracking data and gaze data are obtained from camera frames. According to one or more embodiments, the hand tracking data may include image data and/or depth data. The hand tracking data may be obtained from one or more cameras, including stereoscopic cameras or the like. In some embodiments, the hand tracking data may include sensor data captured by outward facing cameras of a head mounted device. The hand tracking data may be obtained from a hand tracking network, or another source which generates hand tracking data from camera or other sensor data.

The flowchart 700 continues at block 710, where a failed attempted input gesture is detected based on hand tracking data, and using a first set of heuristics. Initially, a hand pose may be determined based on the hand tracking data. As described above, the device may consider gaze information, UI geometry, contextual information, or the like. The hand pose data may include joint locations and/or orientations, skeletal features, and the like. In some embodiments, other data can be provided by the hand pose network which is derived from the determination of the hand pose. For example, a relative location of a device to the hand may be determined based on the hand pose data. In doing so, the hand tracking network may provide an estimated location for a device. The gesture is detected based on the hand pose. In some embodiments, the device may select a gesture from among a set of predefined gesture classifications based on the pose. In some embodiments, the gesture may be based on hand pose in a single frame (or, in some embodiments, stereoscopic frame pair), over a series of frames, or the like. The gesture may be determined, for example, by a gesture determination framework 310, as described above. The hand tracking module 304 may determine the hand pose, and/or the gesture determination framework 310 may detect a gesture based on a first set of heuristics. An attempted selection may fail when the hand pose is not well formed, or if the gaze is not sufficiently targeted on a UI component. Thus, the particular gesture may be identified, but may fall short of being sufficient to result in an input action. Other gestures may fail for different reasons. For example, a scroll may involve a gaze and pinch, but the gaze is less vital to a determination that the scroll should be performed. In some embodiments, the determination as to a failure point for the gesture may be based on a confidence value for each component derived from the gesture. For example, a well-formed pinch may be associated with a high confidence value, or a gaze on the edge of a target region for a component or outside a target region for any component may be associated with a low confidence value. However, the confidence value for the gaze may be weighted more heavily for the selection than the scroll. At the same time, scrolls may be associated with different detectability issues. For example, the first time a downward scroll is performed, the system may have difficulty distinguishing between the scroll and a drop of the hands to the user's side. However, when the motion is repeated, the confidence value may increase that the motion is a scroll gesture.

The flowchart proceeds to block 715, where a determination is made as to whether the failure at block 710 was due to a hand component of a gesture. As described above, a gesture may have, for example, a hand component and a gaze component. In this example flowchart, a hand component is used. However, it should be understood that any particular component of an input gesture having multiple components may be utilized. The failure may be due to a hand component, for example, if a gesture at the hand pose is not well formed, such as an alternative or unexpected pinch style, or the like. In some embodiments, the failure point may be determined by comparing a confidence value for a particular component to a threshold confidence value. The threshold confidence value used may be a global value for all gestures, or may be gesture-specific. Further, a determination may be made based on a component having the lowest confidence value. That is, if the confidence value for the hand is less than a confidence value of the gaze, then the hand may be considered to be the failure point.

If a determination is made that the failure is not due to a hand component, then the flowchart proceeds to block 720. At block 720, a determination is made as to whether the failure is due to a gaze component. Again, a gesture may have, for example, a hand component and a gaze component. In this example flowchart, a hand component is used. However, it should be understood that any particular alternative component of an input gesture having multiple components may be utilized. If a determination is made that the failure is not due to a gaze component (or, alternatively, that the particular reason failure may not be isolated), then the flowchart returns to block 705 and the hand tracking data continues to be obtained and processed. However, in some embodiments, the flowchart may proceed to block 735, and new hand tracking data may be captured.

Returning to block 715, if a determination is made that the attempted input gesture fails due to a hand component of the input gesture, then the flowchart proceeds to optional block 725. At block 725, the first gesture heuristics are modified to second gesture heuristics related to the gesture detection with respect to the hand pose. The gesture heuristics may be particular, modifiable heuristics, which are used to detect input gestures, and/or determine an intentionality of the input gesture or whether the input gesture should cause a selection of a component. Modifying the heuristics includes causing the first set of heuristics to be more forgiving such that it becomes easier for a hand pose to be determined to be a valid input gesture. According to some embodiments, the heuristics may be modified dynamically upon a detected failed attempt or in response to a detected repeated attempt. The heuristics may be modified in a predefined manner, or based on characteristics of the failed attempt, such as an unexpected pinch type or the like. In some embodiments, a gesture may be associated with multiple sets of predefined heuristics, and modifying the first gesture heuristics to second gesture heuristics may involve selecting a second set of predefined heuristics for the gesture, where the second set of predefined heuristics may be more likely to detect a valid input gesture than the first set of heuristics. According to one or more embodiments, the heuristics may be relaxed in a targeted manner. For example, if the gesture was related to a scroll and the UI includes a vertical scroll and not a horizontal scroll, then the heuristics would be modified to be more likely to detect a vertical scroll, but not a horizontal scroll.

Returning to block 720, if a determination is made that the failure is due to the gaze component, then the flowchart proceeds to block 730. At block 730, the first gesture heuristics are modified to second gesture heuristics related to the target gaze radius for one or more UI components. According to one or more embodiments, a user's gaze during the gesture may be detected at a target gaze position outside a target region for any present UI component displayed at the time. In some embodiments, a target region for a UI component nearest the user's gaze target may be increased. Alternatively, the target regions for multiple UI components may be increased for the second gesture heuristics. According to one or more embodiments, the heuristics may be relaxed in a targeted manner. For example, the target region may be increased for a nearest UI component, but not for all UI components on a user interface.

Although blocks 715-730 relate to a hand component and a gaze component, and their corresponding related heuristics, it should be understood that other components of input gestures may be used. Examples may include, for example, arm or limb position, head position and orientation, or the like. In these situations, the second gesture heuristics may be modified based on the particular components of the input gesture.

In response to obtaining second gesture heuristics, the flowchart 700 proceeds to block 735 where new hand tracking data is obtained from new camera frames. In some embodiments, the hand tracking data may be continuously obtained from the one or more cameras, including stereoscopic cameras or the like. In some embodiments, the hand tracking data may include sensor data captured by outward facing cameras of a head mounted device. The hand tracking data may be obtained from hand tracking network, or another source which generates hand tracking data from camera or other sensor data.

Following block 735 at block 740, a new attempted input gesture is detected based on the hand tracking data. An attempted input gesture may be determined, for example, when a hand pose over a set of frames matches a predefined input gesture with some level of confidence. For purposes of this flowchart, an attempted input gesture occurs when a gesture determination framework 310 determines that a hand pose is potentially associated with a particular input gesture. In some embodiments, the attempted input gesture may fail, for example, when the particular pose is insufficient to trigger an input action, or when it is determined that the gesture was performed unintentionally. Thus, an attempted input gesture may include actual input gestures, and hand poses that are sufficiently close to input gestures based on a given set of heuristics.

The flowchart continues to block 745 where a determination is made as to whether the new attempted input gesture is a repeated attempted input gesture. An input gesture is a repeated input gesture if the new attempted input gesture is associated with a same input gesture as a prior attempted input gesture. In some embodiments, other considerations are used to determine whether an attempted input gesture is a repeated input gesture. For example, the new attempted input gesture may have to occur within a predetermined time from the prior attempted input gesture. As another example, the new attempted input gesture being associated with the same input gesture as the immediately preceding attempted input gesture may cause the new attempted input gesture to be a repeated input gesture. That is, no other input gestures may be recognized between the two input gesture attempts of the same type of input gesture. If the new attempted input gesture is not determined to be a repeated attempted input gesture, then the flowchart 700 proceeds to optional block 760 and the heuristics used for the particular input gesture are reverted from the second set of heuristics to the first set of heuristics. That is, if the heuristics had been modified to second gesture heuristics prior in the flowchart, at optional block 760, the heuristics would be reverted to the initial heuristics. The flowchart 700 then returns to block 705, and the system continues to process hand tracking data.

Returning to block 745, if a determination is made that the new attempted input gesture is a repeated input gesture, then the flowchart 700 proceeds to block 750, where, as an optional step, the first gesture heuristics are modified to more permissive second gesture heuristics. This may occur, for example, if block 725 was not performed. The gesture heuristics may be particular, modifiable heuristics, which are used to detect input gestures, and/or determine an intentionality of the input gesture or whether the input gesture should cause a selection of a component.

The flowchart 700 then proceeds to block 755, where the system process the input gesture for potential input actions using the second gesture heuristics. That is, the more relaxed heuristics are used to process the attempted input gesture to be more forgiving in determining whether the input gesture should trigger a user input action. Thus, the input action may not be triggered on a repeated attempt, but the input action may be more likely to be triggered on a repeated attempt due to the relaxed second set of heuristics. The flowchart 700 then returns to block 755 where the heuristics used for the particular input gesture are reverted from the second set of heuristics to the first set of heuristics. The flowchart 700 then returns to block 705, and the system continues to process hand tracking data.

Figure 8:
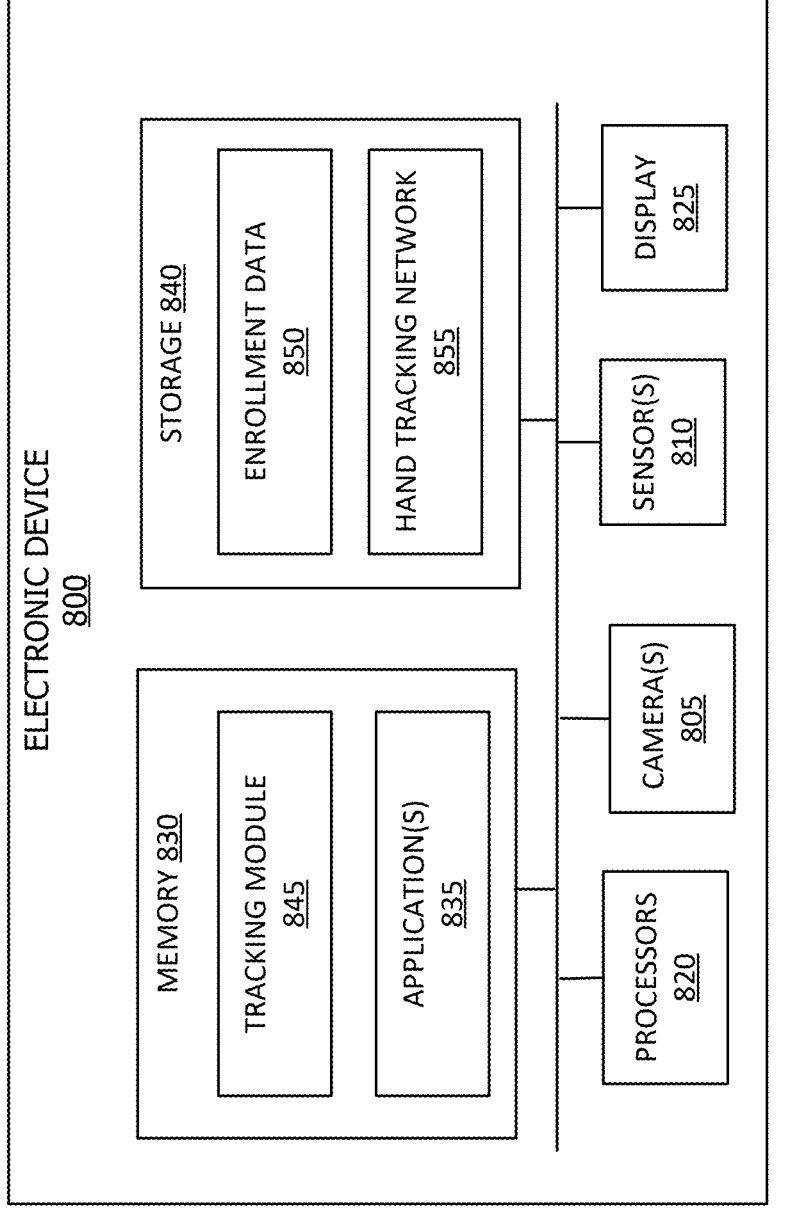
FIG. 8 shows a system diagram of an electronic device which can be used for gesture recognition, in accordance with one or more embodiments.

Referring to FIG. 8, a simplified block diagram of an electronic device 800 is depicted. Electronic device 800 may be part of a multifunctional device, such as a mobile phone, tablet computer, personal digital assistant, portable music/video player, wearable device, head-mounted systems, projection-based systems, base stations, laptop computer, desktop computer, network device, or any other electronic systems such as those described herein. Electronic device 800 may include one or more additional devices within which the various functionality may be contained or across which the various functionality may be distributed, such as server devices, base stations, accessory devices, etc. Illustrative networks include, but are not limited to, a local network such as a universal serial bus (USB) network, an organization's local area network, and a wide area network such as the Internet. According to one or more embodiments, electronic device 800 is utilized to interact with a user interface of an application 835. It should be understood that the various components and functionality within electronic device 800 may be differently distributed across the modules or components, or even across additional devices.

Electronic Device 800 may include one or more processors 820, such as a central processing unit (CPU) or graphics processing unit (GPU). Electronic device 800 may also include a memory 830. Memory 830 may include one or more different types of memory, which may be used for performing device functions in conjunction with processor (s) 820. For example, memory 830 may include cache, ROM, RAM, or any kind of transitory or non-transitory computer-readable storage medium capable of storing computer-readable code. Memory 830 may store various programming modules for execution by processor(s) 820, including tracking module 845, and other various applications 835. Electronic device 800 may also include storage 840. Storage 840 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 840 may be utilized to store various data and structures which may be utilized for storing data related to hand tracking and UI preferences. Storage 840 may be configured to store data used for hand tracking, such as hand tracking network 855 and enrollment data 850, according to one or more embodiments. Electronic device may additionally include a network interface from which the electronic device 800 can communicate across a network.

Electronic device 800 may also include one or more cameras 805 or other sensors 810, such as a depth sensor, from which depth of a scene may be determined. In one or more embodiments, each of the one or more cameras 805 may be a traditional RGB camera or a depth camera. Further, cameras 805 may include a stereo camera or other multi-camera system. In addition, electronic device 800 may include other sensors 810 which may collect sensor data for tracking user movements, such as a depth camera, infrared sensors, or orientation sensors, such as one or more gyroscopes, accelerometers, and the like.

According to one or more embodiments, memory 830 may include one or more modules that comprise computer-readable code executable by the processor(s) 820 to perform functions. Memory 830 may include, for example, tracking module 845, and one or more application(s) 835. Tracking module 845 may be used to track locations of hands and other user motion in a physical environment. Tracking module 845 may use sensor data, such as data from cameras 805 and/or sensors 810. In some embodiments, tracking module 845 may track user movements to determine whether to trigger user input from a detected input gesture. Electronic device 800 may also include a display 825 which may present a UI for interaction by a user. The UI may be associated with one or more of the application(s) 835, for example. Display 825 may be an opaque display or may be semitransparent or transparent. Display 825 may incorporate LEDs, OLEDs, a digital light projector, liquid crystal on silicon, or the like.

Although electronic device 800 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 9:
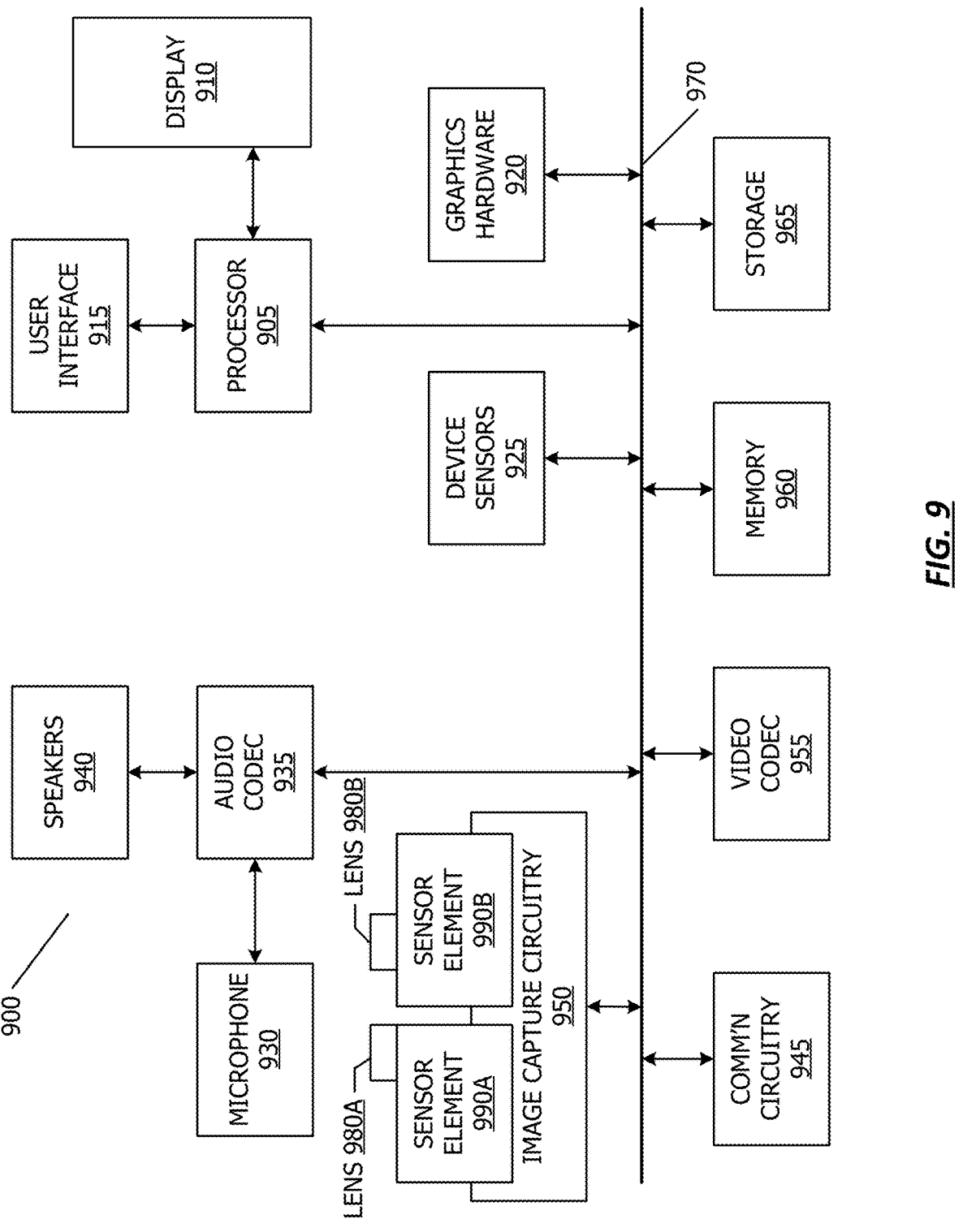
FIG. 9 shows an exemplary system for use in various extended reality technologies.

Referring now to FIG. 9, a simplified functional block diagram of illustrative multifunction electronic device 900 is shown according to one embodiment. Each of electronic devices may be a multifunctional electronic device, or may have some or all of the described components of a multifunctional electronic device described herein. Multifunction electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, digital image capture circuitry 950 (e.g., including camera system), video codec(s) 955 (e.g., in support of digital image capture unit), memory 960, storage device 965, and communications bus 970. Multifunction electronic device 900 may be, for example, a digital camera or a personal electronic device such as a personal digital assistant (PDA), personal music player, mobile telephone, or a tablet computer.

Processor 905 may execute instructions necessary to carry out or control the operation of many functions performed by device 900 (e.g., such as the generation and/or processing of images as disclosed herein). Processor 905 may, for instance, drive display 910 and receive user input from user interface 915. User interface 915 may allow a user to interact with device 900. For example, user interface 915 can take a variety of forms, such as a button, keypad, dial, a click wheel, keyboard, display screen, touch screen, gaze, and/or other gestures. Processor 905 may also, for example, be a system-on-chip such as those found in mobile devices and include a dedicated GPU. Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 to process graphics information. In one embodiment, graphics hardware 920 may include a programmable GPU.

Image capture circuitry 950 may include two (or more) lens assemblies 980A and 980B, where each lens assembly may have a separate focal length. For example, lens assembly 980A may have a short focal length relative to the focal length of lens assembly 980B. Each lens assembly may have a separate associated sensor element 980. Alternatively, two or more lens assemblies may share a common sensor element. Image capture circuitry 950 may capture still and/or video images. Output from image capture circuitry 950 may be processed by video codec(s) 955, processor 905, graphics hardware 920, and/or a dedicated image processing unit or pipeline incorporated within circuitry 950. Images so captured may be stored in memory 960 and/or storage 965.

Sensor and camera circuitry 950 may capture still and video images that may be processed in accordance with this disclosure, at least in part, by video codec(s) 955, processor 905, graphics hardware 920, and/or a dedicated image processing unit incorporated within circuitry 950. Images so captured may be stored in memory 960 and/or storage 965. Memory 960 may include one or more different types of media used by processor 905 and graphics hardware 920 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory computer-readable storage mediums including, for example, magnetic disks (fixed, floppy, and removable) and tape, optical media such as CD-ROMs and DVDs, and semiconductor memory devices such as EPROM and EEPROM. Memory 960 and storage 965 may be used to tangibly retain computer program instructions, or code organized into one or more modules and written in any desired computer programming language. When executed by, for example, processor 905, such computer program code may implement one or more of the methods described herein.

Various processes defined herein consider the option of obtaining and utilizing a user's identifying information. For example, such personal information may be utilized in order to track motion by the user. However, to the extent such personal information is collected, such information should be obtained with the user's informed consent, and the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well established and in compliance with or above governmental/industry standards. Moreover, these parties will not distribute, sell, or otherwise share such information outside of any reasonable and legitimate purposes.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at city level rather than at an address level), controlling how data is stored (e.g., aggregating data across users), and/or other methods.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3-7 or the arrangement of elements shown in FIGS. 1 and 8-9 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
    detecting a first instance of a gesture based on hand tracking data;
    determining that the first instance of the gesture fails to satisfy an input action trigger, wherein the input action trigger corresponds to a first set of heuristics;
    detecting a second instance of the gesture based on additional hand tracking data; and
    in accordance with detecting a repeated instance of the gesture:
        determining that the second instance of the gesture satisfies the input action trigger based on a second set of heuristics corresponding to the input action trigger,
        wherein the second set of heuristics differ from the first set of heuristics.

2. The method of claim 1, further comprising:
    modifying the first set of heuristics to obtain the second set of heuristics in accordance with the determination that the first instance of the gesture fails to satisfy the input action trigger.

3. The method of claim 2, wherein modifying the first set of heuristics comprises:
    determining a characteristic of the first instance of the gesture contributing to a failure to satisfy the input action trigger; and
    modifying the first set of heuristics in accordance with the characteristic.

4. The method of claim 1, further comprising:
    in response to determining whether the second instance of the gesture satisfies the input action trigger, reverting the second set of heuristics for the gesture to the first set of heuristics for the gesture.

5. The method of claim 1, wherein the input action trigger is further based on gaze information.

6. The method of claim 5, wherein the first instance of the gesture is associated with first gaze data, wherein the first gaze data targets a first input component, and wherein the second set of heuristics comprise prioritizing the first input component.

7. The method of claim 1, wherein the determination as to whether second instance of the gesture satisfies the input action trigger is further determined in accordance with a determination that the second instance of the gesture occurs within a threshold distance of the first instance of the gesture.

8. The method of claim 1, wherein the second set of heuristics for the gesture are more permissive than the first set of heuristics for the gesture.

9. A non-transitory computer readable medium comprising computer readable code executable by one or more processors to:

detect a first instance of a gesture based on hand tracking data;

determine that the first instance of the gesture fails to satisfy an input action trigger, wherein the input action trigger corresponds to a first set of heuristics;

detect a second instance of the gesture based on additional hand tracking data; and in accordance with detecting a repeated instance of the gesture:

determine that the second instance of the gesture satisfies the input action trigger based on a second set of heuristics corresponding to the input action trigger, wherein the second set of heuristics differ from the first set of heuristics.

10. The non-transitory computer readable medium of claim 9, wherein the gesture comprises a selection gesture.

11. The non-transitory computer readable medium of claim 10, wherein determining that the first instance of the gesture fails to satisfy the input action trigger based on the first set of heuristics for the gesture comprises:

determining that a user input component is a failed selection in response to the first instance of the gesture.

12. The non-transitory computer readable medium of claim 10, wherein the selection gesture comprises a gaze component and a hand gesture component, wherein a user interface component is selectable based on a combination of the gaze component and the hand gesture component of the gesture.

13. The non-transitory computer readable medium of claim 12, wherein the first set of heuristics comprises a first gaze target radius, and wherein the second set of heuristics comprises a second gaze target radius larger than the first gaze target radius.

14. The non-transitory computer readable medium of claim 9, wherein the first set of heuristics comprise a stricter set of parameters for determining gesture intentionality than the second set of heuristics.

15. A system comprising:

one or more processors; and one or more computer readable media comprising computer readable code executable by the one or more processors to:

detect a first instance of a gesture based on hand tracking data;

determine that the first instance of the gesture fails to satisfy an input action trigger, wherein the input action trigger corresponds to a first set of heuristics;

detect a second instance of the gesture based on additional hand tracking data; and in accordance with detecting a repeated instance of the gesture:

determine that the second instance of the gesture satisfies the input action trigger based on a second set of heuristics corresponding to the input action trigger, wherein the second set of heuristics differ from the first set of heuristics.

16. The system of claim 15, further comprising computer readable code to:

modify the first set of heuristics to obtain the second set of heuristics in accordance with the determination that the first instance of the gesture fails to satisfy the input action trigger.

17. The system of claim 15, further comprising computer readable code to in response to determining whether the second instance of the gesture satisfies the input action trigger, revert the second set of heuristics for the gesture to the first set of heuristics for the gesture.

18. The system of claim 15, wherein the input action trigger is further based on gaze information.

19. The system of claim 15, wherein the gesture comprises a selection gesture.

20. The system of claim 15, wherein the first set of heuristics comprise a stricter set of parameters for determining gesture intentionality than the second set of heuristics.

\*    \*    \*    \*    \*